Figure 1:
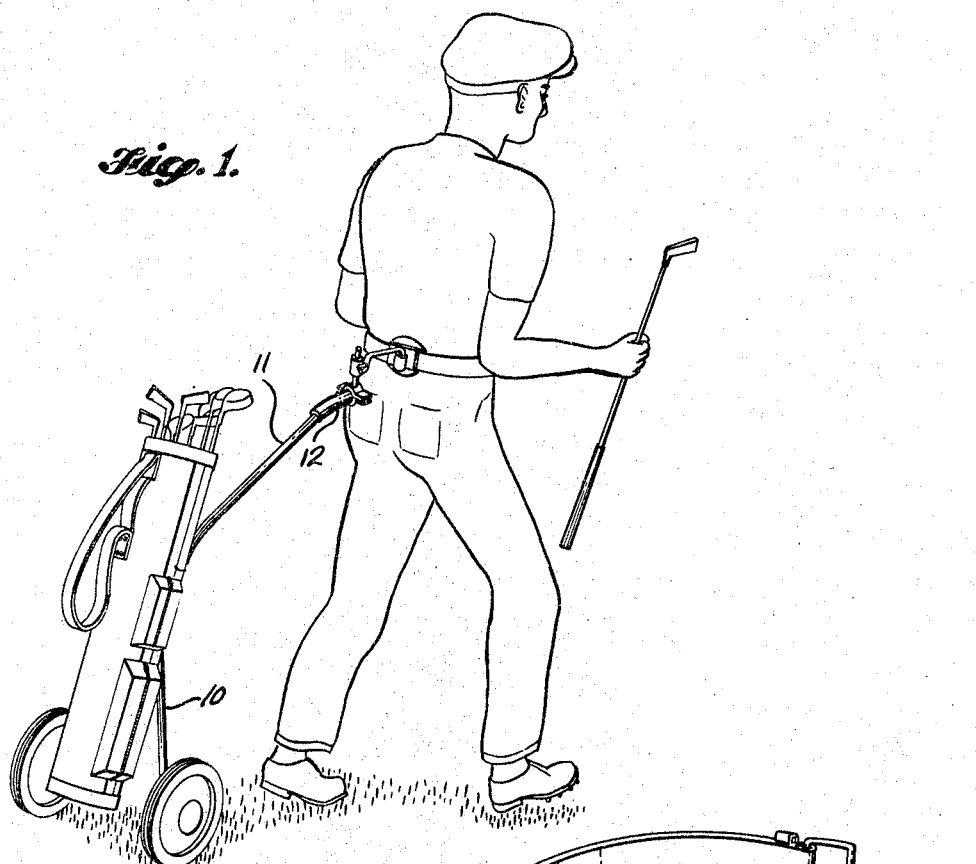

June 27, 1967  V. M. JOHNSON  3,328,043
GOLF CART COUPLING APPARATUS

Filed June 16, 1965  2 Sheets-Sheet 1

INVENTOR.
VIRGIL M. JOHNSON

BY Orland M. Christensen

ATTORNEY

June 27, 1967  V. M. JOHNSON  3,328,043
GOLF CART COUPLING APPARATUS
Filed June 16, 1965  2 Sheets-Sheet 2
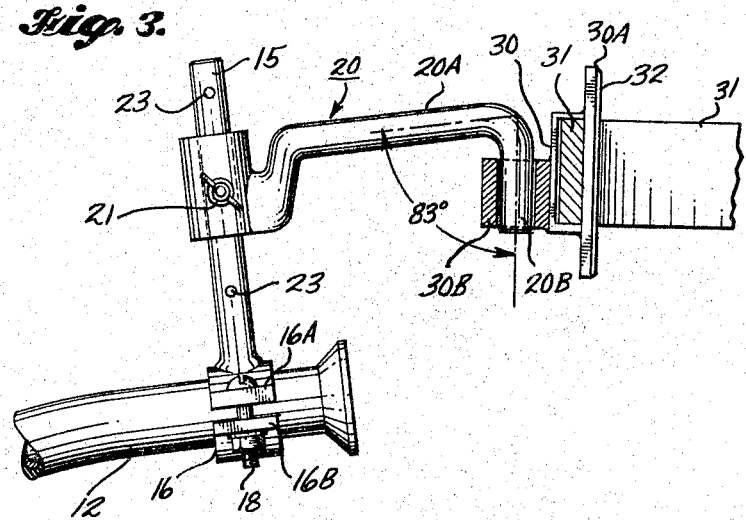
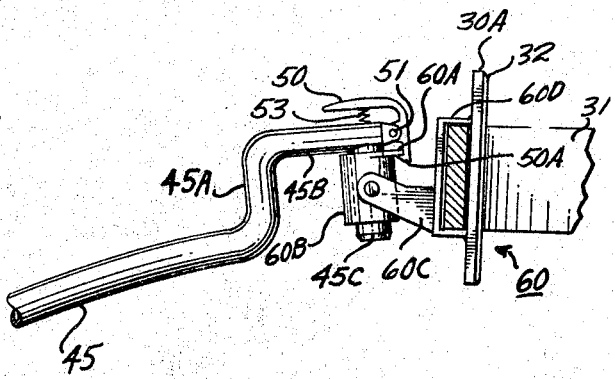
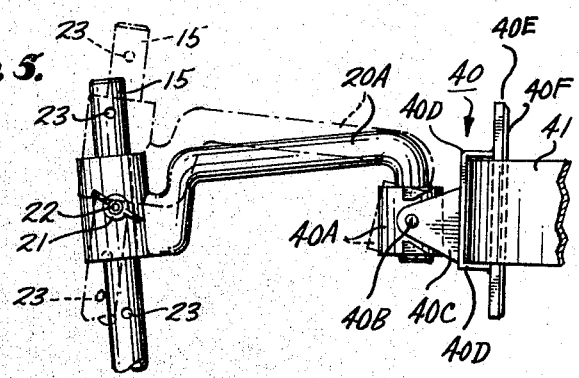
INVENTOR.
VIRGIL M. JOHNSON
BY Orland M. Christensen
ATTORNEY

# United States Patent Office 3,328,043
Patented June 27, 1967

3,328,043
GOLF CART COUPLING APPARATUS
Virgil M. Johnson, Everett, Wash., assignor to Alvin H. Bakeng and Jessie L. Bakeng, both of Everett, Wash.
Filed June 16, 1965, Ser. No. 464,310
8 Claims. (Cl. 280—1.5)

The present invention relates generally to hand-pulled golf carts and more particularly to an improved coupling apparatus for coupling a golf cart to the torso of a golfer and thereby facilitate the pulling of a golf cart over the ground.

Golf carts of the type having a forwardly and upwardly protruding handle are well-known and widely in use at the present time. Unless a golfer has a caddy he must pull the cart around the golf course and therefore one of his hands is normally busied with the task of gripping the golf cart handle. This not only leads to fatigue of the arm muscles, which then later frequently tends to cause the golfer to hook or to slice as a result of the more rapid fatigue of one arm, as compared to the other, but also prevents the use of both hands by the golfer for other activities while walking around the course. For example if the golfer desires to light a cigarette while walking between shots the necessity for one hand to be on the golf cart handle forces the golfer to stop in order to free both hands. If the game is being played on a rainy day, the golfer is further hampered since it is common practice to make use of an umbrella carried by the golfer around the course and therefore both hands are busy between shots. Thus with one hand gripping the golf cart handle and the other holding an umbrella, it becomes impossile to smoke, have a bottle of pop, or have a snack while walking between shots.

From the above, it will be seen that it would be advantageous for a golfer to be able to pull his cart around the course in a comfortable manner and yet not be bothered with having one hand constantly on the cart handle.

Accordingly, it is an object of the present invention to provide an apparatus for attaching a golf cart to the torso of a golfer.

It is another object of the present invention to provide a low-cost and simplified coupling mechanism for coupling the handle of a golf cart to the mid-section of a golfer's body.

An additional object of the present invention is to provide a coupling mechanism for permitting ready attachment and detachment of a golfer cart handle to the torso of a golfer.

Another object of the present invention is to provide a quick disconnecting coupling apparatus for selectively coupling the handle of a golf cart to the torso of a golfer, and, wherein, the coupling apparatus is so constructed that the cart is easily pulled behind the golfer regardless of whether the golfer is going over uneven ground, uphill, or downhill.

The above as well as additional objects of the invention are achieved through the use of a simplified coupling mechanism which is attached to the handle of a golf cart and is provided with a coupling member which is selectively engageable with a mated coupling member carried on a belt worn by the golfer. The arrangement is such that the golfer can readily attach and detach the first coupling member secured to the golf cart handle from the second coupling member carried on a belt worn by the golfer. Thus the golf cart can be disconnected from the body of the golfer when a shot is to be made, with the time required for connecting and disconnecting the golf cart to the torso of the golfer being very short. In accordance with the teachings of the present invention, the angular relationship between the connecting members is so selected that the apparatus reduces golfer fatigue when pulling the cart, even when going uphill or downhill, and also undesired detachment of one coupling member from the other is avoided. In accordance with other aspects of the invention, the handle of the golf cart itself is so formed as to serve as part of the first coupling member for selective engagement with the second coupling member carried by the golfer on a belt or similar arrangement.

Figure 2:
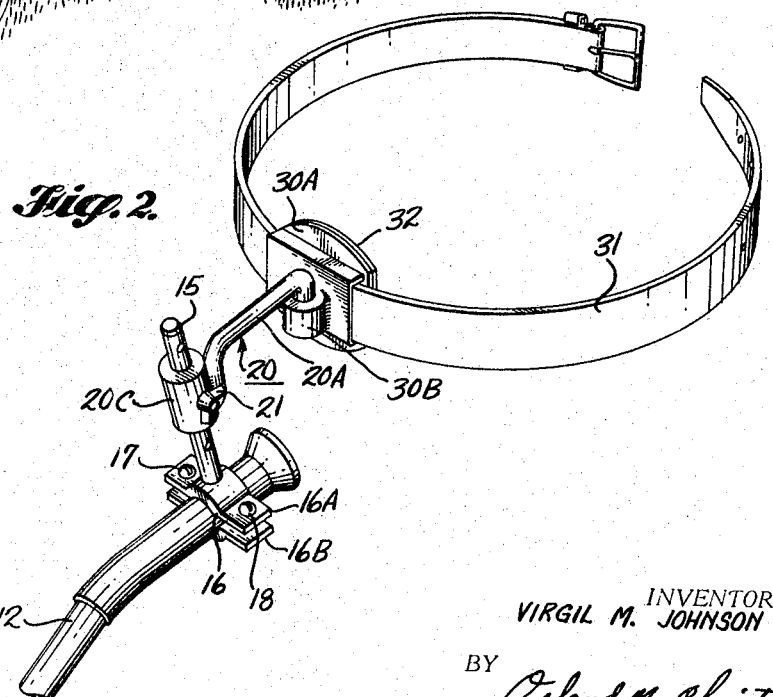

These and other objects and advantages of the present invention, will be more clearly understood from the following description when read with reference to the accompanying drawings, and, wherein, FIGURE 1 is a perspective view of a golfer having a golf cart coupled with the mid-section of his body by means of the improved and novel golf cart coupling assembly of the present invention, FIGURE 2 is an enlarged isometric view of the embodiment of the golf cart coupling apparatus shown in FIGURE 1, FIGURE 3 is a side elevation and partial cross section of the preferred embodiment of the invention illustrated in FIGURE 2 and showing with greater detail the relationship of parts, FIGURE 4 is another embodiment of the present invention similar to that of FIGURES 2 and 3 but including a selectively operable latching mechanism and wherein the handle of the cart forms part of the coupling apparatus, and FIGURE 5 is a side elevation of an embodiment of the present invention wherein the coupling member carried on the torso of the golfer is so constructed that a limited degree of pivoting thereof can take place.

Referring now to the drawings, and in particular to FIGURES 1, 2 and 3, there is shown in detail a preferred embodiment of the present invention which is adapted for use in combination with a conventional golf cart 10 having a forwardly and upwardly protruding handle 11 with a handle grip 12 secured to the end of the handle. As seen most clearly in FIGURES 2 and 3, the coupling apparatus of the present invention includes a substantially vertical extending post member 15 which is rigidly secured to the golf handle 11 by means of the clamp apparatus 16 fitted about the handle grip 12. While various types of clamping devices and associated post members can be utilized to provide an upstanding shaft or post 15, in the embodiment of the invention shown in FIGURES 2 and 3 the clamp apparatus includes first and second clamp members 16A and 16B having opposed semicircular sections adapted to be disposed about the handle 12 and locked in place thereon by means of the nut and bolt assemblies 17 and 18. The post 15 may be formed as part of the upper clamping member 16A, as for example by welding a steel shaft 15 to a steel clamping member 16A.

A first coupling member 20 is shown as being in the form of a bent metal rod having first and second straight sections 20A and 20B and also a cylindrical section 20C with a hole bored therethrough for receiving the upwardly standing shaft 15. The first coupling member 20 is positioned on the shaft 15 and is held in place thereon by means of the adjustment and locking assembly which is shown as a conventional wing nut and bolt 22 which passes through one of the three horizontal holes 23 provided in the steel shaft 15. It will be seen that the arrangement permits selective adjustment of the first coupling member 20 to any selected elevation on the upstanding shaft 15.

As seen most clearly in FIGURE 3 the forward (rightward in FIGURE 3) section 20B of the first coupling member 20 is bent downwardly with respect to the section 20A. As described in greater detail hereinafter, the section 20B is substantially vertical and the section 20A is preferable at an angle of less than 90° with respect thereto. I have found in practice that when the angle between the two sections 20A and 20B is approximately 83° maximum comfort to the user is obtained, although angles within the range of approximately 83° through 87° will result in user comfort and avoid uncoupling (as described below).

A second coupling member 30 is adapted to be worn on a belt 31, and as seen most clearly in FIGURES 2 and 3, is provided with a back-engaging section 30A and a coupling section 30B. The coupling section 30B is in the form of a right-circular cylinder having a hole bored vertically therethrough for receiving the end 20B of the first coupling member. The second coupling member may be made of suitable material to provide a strong coupling apparatus, as for example steel or other metal. To reduce wearer discomfort, a cushioning pad 32 is secured to the section 30A and is preferably made of felt, foam rubber or and other similar cushioning material. The section 30A is provided with a rectangular opening therethrough to permit the passage of the belt 31 for attachment of the second coupling member 30 to the middle of the back of the golfer.

As seen in FIGURE 1, the apparatus shown in greater detail in FIGURES 2 and 3 frees the hands of the golfer without placing any appreciable load on the back of the golfer. In practice it is found that the small load placed on the back midsection of the golfer is relatively unnoticeable. It should be noted in FIGURE 3 that a small amount of clearance is provided between the cylindrical section 30B of the second coupling member 30 and the downwardly extending portion 20B of the first coupling member 20, so that the coupling apparatus will permit easy pivoting of the golfer with respect to the golf cart and without creating a bind therebetween. It has been found that a golfer is able to pivot (or turn) from a forward facing position through 90° in either direction to reach clubs.

While the embodiment of the invention shown in FIGURES 1, 2 and 3 has been found to work well, the embodiment of FIGURE 5 includes the additional feature of having a pivoted coupling member 40 carried on the back of the golfer by a belt 41. Thus it will be seen that member 40 has a portion 40A having a vertical hole bored therethrough for receiving the end 20B of the first coupling member 20, pivoted by a pin 40B on a bracket or supporting section 40C. The section 40C is in the shape of a U shaped bracket which may be formed by being welded to the back of the channel section 40D through which the belt 41 passes. A backplate 40E and pad 40F form part of the member 40. The arrangement is such that the handle of the golf cart can undergo a limited degree of up and down oscillating movement with the extent of such movement being limited by engagement of the cylindrical coupling section 40A with the channel section 40D or any other suitable stop member which can be provided.

In the embodiment of the invention shown in FIGURE 4 the golf cart handle 45 is formed with a vertical section 45A, a substantially horizontal section 45B, and a downwardly extending section 45C adapted to cooperate with the second coupling member carried by a belt worn by the golfer. Thus the cart handle acts as a first coupling member. A pivoted latch member 50 is pivoted on a pin 51 which passes through the upper front end of the first coupling member and urged by spring 53 toward latching engagement with the second coupling member 60. It will be seen that the latching member 50 is provided with a latching nose 50A which is adapted to pass beneath a lip or ridge 60A on the cylindrical section 60B of the coupling member 60. A bracket 60C secured to the belt holding section 60D has the cylindrical section 60B pinned thereto to permit a limited amount of movement of the section 60B about a horizontal axis. As in the previous embodiments, the belt-holding section 60D is provided with a padded backplate. In the embodiment of the invention illustrated in FIGURE 4, the latch member 50 serves to prevent any unintentional disengagement of the golf cart handle 45 from the second coupling member 60, and yet permits ready release between the two at any time when the golfer desires to disconnect the cart. As noted above, in the embodiment of the invention shown in FIGURE 4 the golf cart handle 45 is so shaped that it acts as the first coupling member, and thus as in the other embodiments, the sections 45B and 45C form an acute angle of approximately 83° to 87°.

When a golf cart is "free standing" the center of gravity is disposed behind a vertical plane passing through the cart axle, if one considers the handle side to be the front. The golfer then normally grips the handle and moves the same downwardly so that the major portion of the weight is centered directly over the wheels. I have found that with my coupling apparatus it is advantageous to have the center of gravity forward of the vertical plane containing the cart axle so that a slight downward force is exerted on the coupling member carried on the back of the golfer. It will be seen in FIGURE 1 that the handle of the golf cart can be tilted to the desired angle for placing the cart's center of gravity at the desired point forwardly of the axle, and then the vertical position of the first coupling member 20 adjusted with respect thereto so that the sections 20B and 30B of the first and second coupling members are at the same height above the ground. Thus the apparatus is readily adjusted for use by golfers of differing heights. With the section 20B of the first coupling member 20 being disposed at an acute angle with respect to the section 20A, it is found that undesired uncoupling tends to be prevented and also that the weight has the feeling of being transferred downwardly parallel to the wearer's back rather than causing rotation of the second coupling assembly on the wearer's back. It is thought that these results might be partially due to the fact that the section 20B is in a substantially vertical position with respect to the ground when the cart is coupled to the golfer.

There has thus been disclosed an improved and novel coupling apparatus for coupling a golf cart to the torso of a golfer, so that the golfer's hands are free during the travel between shots on the golf course. While the invention has been illustrated by reference to specific presently preferred embodiments thereof, it will of course be obvious to those skilled in the art that additional modifications and changes can be made without deviating from the inventive concepts. Accordingly, it is intended that such modifications and changes as become obvious to a person skilled in the art from the teachings thereof, will be encompassed by the following claims.

What is claimed is:

1. An improved golf cart handle and coupling apparatus for connecting a wheeled golf cart to the back of a golfer comprising in combination: a handle secured to said cart and extending upwardly from the wheels thereof, said handle having a first section substantially parallel to the ground, and a second section adjacent to said first section normally disposed in a substantially vertical direction with respect to the ground, and a third section between said cart wheels and said first section and forming an angle of approximately 90° with respect to said first section, said first and second sections forming an angle of approximately 83°; a coupling member having means for receiving said second section of said handle, and means adapted to secure said coupling member to the lower back of a golfer.

2. A golf cart coupling apparatus for coupling a golf cart to the body of a golfer to thereby free the hands of the golfer, comprising in combination: means defining a first shaft member; clamping means operative to secure said first shaft member to the handle of a golf cart with said first shaft member extending in an upwardly direction from said handle; a first coupling member having first and second sections; adjustable means securing said first section to said first shaft member at a selected elevation thereon with said first section being disposed at an angle of approximately 90° with respect to said shaft member, said first and second sections forming an acute angle of approximately 83°; a second coupling member having first coupling means adapted to receive and hold said second section of said first coupling member, and means for securing said second coupling member to the back of a golfer.

3. A coupling apparatus as defined in claim 2 wherein said second coupling member further includes means supporting said first coupling means of said second member for limited rotation about a horizontal axis.

4. A golf cart handle adapted to be used in combination with a coupling member carried on the back of a golfer, said handle comprising: a first section; a second section connected to and extending upwardly from said first section at an angle of approximately 90°; a third section connected to said second section and extending substantially parallel to the ground and forming an angle of approximately 90° with respect to said second section; and a fourth section connected to said third section and extending downwardly therefrom and adapted to be held by the coupling member carried on the back of a golfer.

5. A handle as defined in claim 4 and further including latch means secured to said third section and adapted to engage the coupling member on the back of a golfer.

6. A coupling apparatus for coupling a golf cart to the back of a golfer, comprising in combination: a first coupling member comprising a back plate member, means adapted to secure said member to the back of a golfer, a cylindrical coupling section secured to said back plate member and extending rearwardly from the back of a wearer, said section having a substantially vertical bore therein; and a second coupling member adapted for connection to the handle of a golf cart comprising a coupling pin adapted for positioning in said bore, a first shaft member, clamp means adapted to clamp said shaft member to the handle of a golf cart with said shaft member extending upwardly from the end thereof, and clamp means connected to said coupling pin and adjustably secured to said shaft member to permit adjustment of the height of said coupling pin above the ground without requiring movement of said handle.

7. In combination with a golf cart having a pair of wheels and adapted to be moved about a golf course by a golfer, an apparatus for coupling the cart to the body of a golfer comprising in combination:
 a golf cart handle,
 a first coupling member adapted to be secured to said handle and including a first downwardly extending coupling section,
 a second coupling member having means for receiving a belt for attaching the same to the midsection of the back of a golfer,
 said second coupling member including a second coupling section adapted to receive and hold said first coupling section of said first coupling member, said first member further including means for adjusting the elevation of said first section with respect to said handle, whereby said handle can be adjusted to a selected position of balance for the cart with said means permitting adjustment permitting the use of said apparatus by golfers of different heights.

8. In combination with a golf cart having a pair of wheels and adapted to be moved about a golf course by a golfer, an apparatus for coupling the cart to the body of a golfer comprising in combination:
 a golf cart handle,
 a first coupling member adapted to be secured to said handle and including a first downwardly extending coupling section,
 a second coupling member having means for receiving a belt for attaching the same to the midsection of the back of a golfer,
 said second coupling member including a second coupling section adapted to receive and hold said first coupling section of said first coupling member and means supporting said second section for pivoting movement about an axis substantially parallel to the surface of the ground.

References Cited

UNITED STATES PATENTS

| | | | |
|---|---|---|---|
| 2,559,981 | 7/1951 | McBride | 224—5 |
| 2,613,953 | 10/1952 | Giovannoni | 280—1.5 |
| 3,051,505 | 8/1962 | Flanagan | 280—47.26 |
| 3,237,968 | 3/1966 | Arsenault | 280—492 |

FOREIGN PATENTS

| | | |
|---|---|---|
| 74,064 | 10/1948 | Norway. |

LEO FRIAGLIA, *Primary Examiner.*